Dec. 24, 1935.    O. B. CLARK    2,025,228
LUBRICATING DEVICE
Filed July 29, 1932
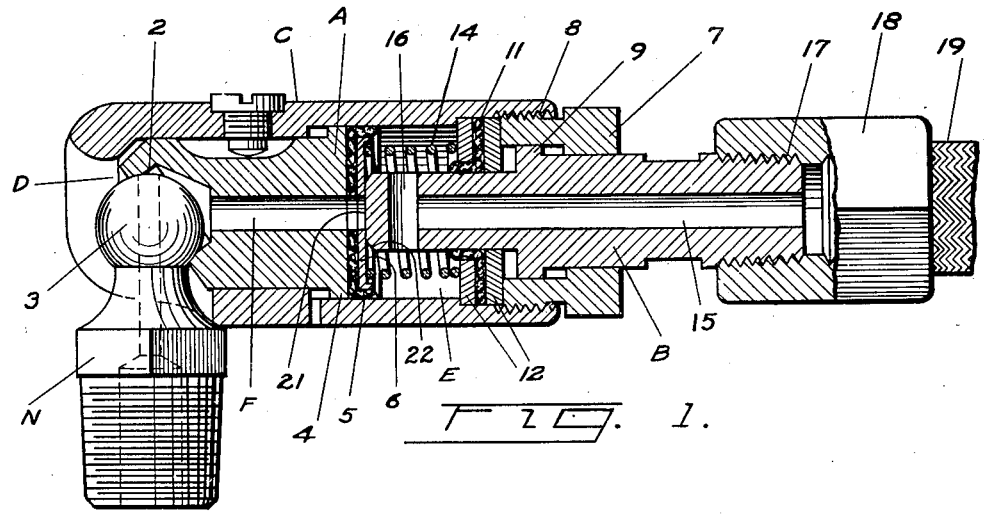
Fig. 1.
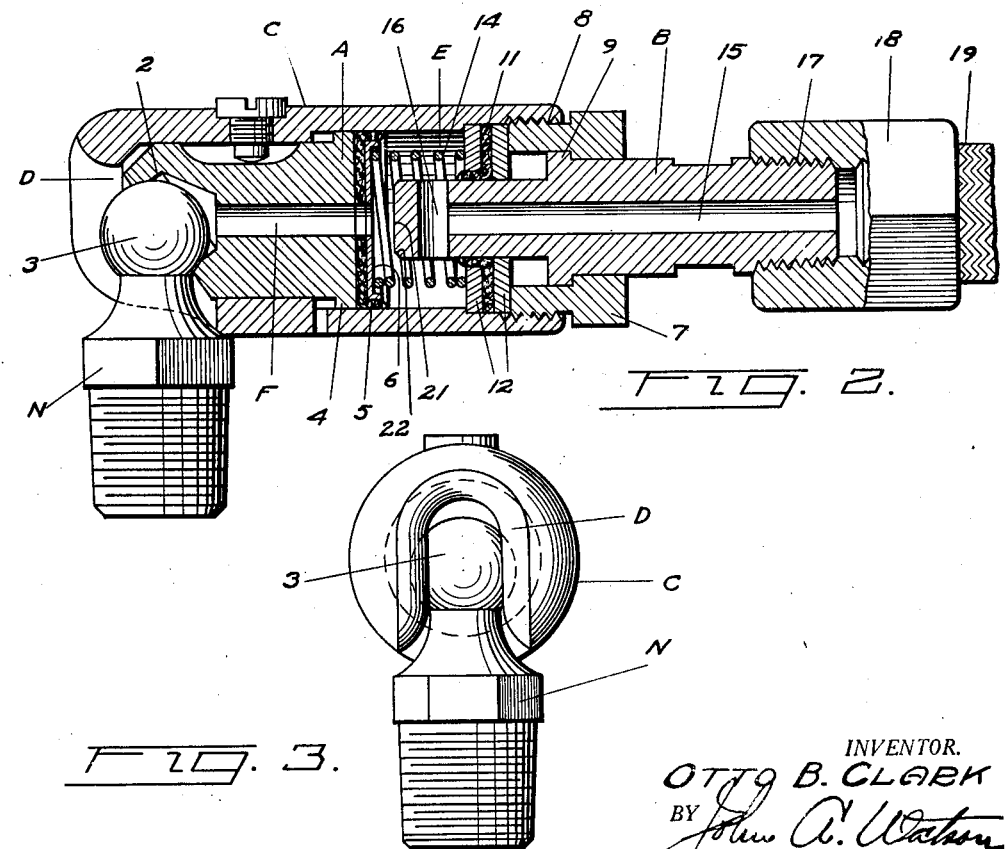
Fig. 2.
Fig. 3.
INVENTOR.
OTTO B. CLARK
BY
ATTORNEY.

Patented Dec. 24, 1935

2,025,228

UNITED STATES PATENT OFFICE 2,025,228

LUBRICATING DEVICE

Otto B. Clark, South Bend, Ind., assignor to The Lubrication Corporation, South Bend, Ind., a corporation of Delaware Application July 29, 1932, Serial No. 625,583

10 Claims. (Cl. 284—17)

This invention relates to improvements in lubricating devices and more particularly to lubricant discharge nozzles of the type employed to service a lubricant receiving nipple or fitting associated with a bearing or other part to be lubricated.

An object of the invention is to provide a lubricant discharge nozzle incorporating means for shutting off the flow of lubricant through the nozzle until such time as the contact pressure between the nozzle and lubricant receiving fitting has exceeded a value predetermined by the operator, thereby assuring a seal between nozzle and fitting adequate to withstand the pressure of the lubricant admitted to the nozzle for discharge into the fitting.

Another object is to provide a lubricant discharge nozzle which may be operated within a low pressure range as a pressure clamp nozzle with manually operable shut off effective at will through thrust upon the rearward end of the nozzle.

Other objects, advantages and uses of the invention, will be apparent after reading the following description and claims and after consideration of the accompanying drawing forming a part of this specification, in which:

Fig. 1 is a sectional view of a pressure operated lubricant discharge nozzle constructed according to the invention during initial engagement with a fitting;

Fig. 2 is a view similar to Fig. 1 of the nozzle during the discharge of lubricant into the fitting; and Fig. 3 is a front end elevation of the nozzle of Figs. 1 and 2.

In general, the lubricant discharge nozzle selected for illustration herein comprises a pair of aligned conduit members A and B slidably disposed within a tubular member C formed at its forward end with a clamping jaw D and providing a lubricant pressure chamber E between the conduit members A and B which when subjected to lubricant pressure causes relative movement between the conduit member A and the clamping member C—D to clamp the head of a lubricant receiving fitting N therebetween, the conduit member B being so arranged with respect to the member C as to permit of its manual movement into engagement with the conduit member A to shut off the inner end of the lubricant conducting bore F thereof until displaced by lubricant under a predetermined minimum pressure within the chamber E.

With reference to Figs. 1 and 2, the conduit member A may be provided with a discharge orifice 2 at its forward end adapted to partially receive the spherical head 3 of the fitting N and to form an annular contact therewith providing a lubricant tight seal between the conduit member and the fitting when thrust is applied thereto. The rearward end 4 of the conduit member A is of enlarged diameter and is located within an enlarged portion of the bore of the tubular member C. A sealing member which may consist of a rawhide cup leather 5 is provided for the inner end of the member A. A metal backing ring 6 is disposed upon the rearward face of the cup leather 5.

The rearward end of the tubular member C is closed by a bushing 7, secured thereto by cooperating screw threads 8, through which the conduit member B extends. A flange 9 on the side walls of the member B serves to limit movement of that member outward of the tubular member C. The inner end of the conduit member B is of reduced diameter and is slidably disposed through a sealing washer 11, which may be of rawhide with a forwardly extending sleeve portion at its inner edge. The washer 11 is secured between a pair of metal washers 12 pressed between adjacent portions of the member C and bushing 7 so as to compress the edge of the sealing washer when the bushing is screwed tightly in place as shown. A compression spring 14 is disposed between the backing washer 6 and the adjacent of the washers 12 to urge the conduit member A yieldingly toward the clamping jaw D.

The bore 15 of the conduit member B terminates short of the forward end of the member where it is intersected by a cross bore 16, thus establishing communication between the bore of the conduit member and the chamber E. The rearward end of the member B is provided with external screw threads 17 for receiving the end fitting 18 of a flexible lubricant conducting hose 19 through which lubricant under pressure from a suitable source of supply may be conducted to the nozzle.

In use, the operator may initially engage the nozzle and fitting by moving the nozzle laterally over the head 3 of the fitting to cause the spherical surface of the head to contact with and urge the conduit member A rearwardly against the force of the spring 14 until the head falls partially within the discharge orifice 2 of the member A. In this manner an annular sealing contact is established between the nozzle and the fitting head under the thrust of the spring 14. The operator may next press forwardly upon the conduit member B as by thrust upon the hose 19 and adjacent conduit portions until the forward end 21 of the conduit member B engages with the backing ring 6 of the conduit member A to close the adjacent mouth of the bore F. Lubricant under pressure may now be admitted to the nozzle through the hose 19 where it may travel as far as the chamber E to act upon the conduit member A to cause relative thrust between that member and the tubular member C to securely clamp the nozzle upon the fitting head. Upon the building up of sufficient pressure within the chamber E, the conduit member B may be urged rearwardly against the manual force applied thereto by the operator thereby uncovering the mouth of the bore F so that lubricant under pressure may be conducted therethrough and into the lubricant receiving fitting N. I have provided therefore a lubricant discharge nozzle wherein a predetermined clamping pressure may be obtained prior to the admission of lubricant to the discharge orifice of the nozzle, thus preventing the leakage of lubricant through the sealing contact between nozzle and fitting during the early part of the clamping function. The degree of clamping pressure attained prior to the discharge of lubricant from the nozzle as may be seen may be determined by the amount of manual pressure applied to the conduit member B.

The area of that portion of the conduit member B acted upon by lubricant under pressure within the chamber E to move the conduit surface 21 away from the contacting portion of the conduit member A and uncover the bore F is represented by the area of the bevelled or chamfered portion 22 of the end of the conduit B about the surface 21, which area, as may be seen, is relatively small thereby requiring a relatively high pressure within the chamber E to open the valve formed by the contacting conduit portions and admit lubricant to the discharge orifice 2 of the nozzle.

It is to be understood that the described embodiments of the invention herein set forth are presented for the purpose of illustration only, and various changes may be made therein without departing from the spirit and scope of the invention.

I claim:

1. A lubricant discharge nozzle comprising, a conduit having one end formed for engagement with a lubricant receiving fitting, lubricant pressure operated means for clamping said conduit upon said fitting, and manually operated means for closing said conduit, said closing means being subjected to the lubricant pressure on said clamp operating means whereby said lubricant pressure may act to open said conduit closure means against manual force applied thereto.

2. A lubricant discharge nozzle comprising, a conduit having one end formed for engagement with a lubricant receiving fitting, lubricant pressure operated means for clamping said conduit upon said fitting, resilient means yieldingly urging said clamping means to its clamped position, and manually operated means for closing said conduit, said closing means being subjected to the lubricant pressure on said clamp operating means whereby said lubricant pressure may act to open said conduit closure means against manual force applied thereto.

3. A lubricant discharge nozzle comprising, a tubular casing having a jaw for engaging with the head of a lubricant receiving fitting, a conduit member slidably mounted in said casing, a second conduit member adapted for direct connection with a source of lubricant supply slidably mounted in said casing and adapted to be moved into engagement with said first named conduit member to close the bore thereof and means for admitting lubricant under pressure to said casing between said conduit members to urge one of said members toward said fitting engaging jaw, and the other out of engagement with the first named conduit member when said lubricant pressure exceeds an amount determined by the thrust applied to said second named conduit member.

4. A lubricant discharge nozzle comprising, a tubular casing having a jaw for engaging with the head of a lubricant receiving fitting, a conduit member slidably mounted in said casing, resilient means urging said conduit toward said jaw, a second conduit member slidably mounted in said casing and adapted to be moved into engagement with said first named conduit member to close the bore thereof and means for admitting lubricant under pressure to said casing between said conduit members to urge one of said members toward said fitting engaging jaw, and the other out of engagement with the first named conduit member when said lubricant pressure exceeds an amount determined by the thrust applied to said second named conduit member.

5. A lubricant discharge nozzle, comprising a tubular casing having a jaw for engaging the head of a lubricant receiving fitting, a lubricant pressure operated plunger slidably disposed in said casing adapted to cooperate with said jaw to clamp the head of said fitting therebetween, said plunger having a bore therethrough for conducting lubricant to said fitting, and a conduit member slidably disposed in said casing rearwardly of said plunger and adapted for direct connection with a pressure feed lubricant supply, said conduit having a portion of its forward end wall adapted to contact said plunger and to close the bore thereof when the conduit member is urged toward the plunger, and being further arranged to displace lubricant under pressure acting upon said plunger.

6. A lubricant discharge nozzle comprising, a tubular casing having a jaw for engaging the head of a lubricant receiving fitting, a lubricant pressure operated plunger slidably disposed in said casing adapted to cooperate with said jaw to clamp the head of said fitting therebetween, said plunger having a bore therethrough for conducting lubricant to said fitting, a spring for urging said plunger yieldingly toward said jaw, and a conduit member slidably and rotatably disposed in said casing rearwardly of said plunger and adapted for connection with a pressure feed lubricant supply, said conduit having a portion of its forward end wall adapted to contact said plunger and to close the bore thereof when the conduit member is urged toward the plunger, and being further arranged to displace lubricant under pressure acting upon said plunger.

7. In a lubricant discharge nozzle, a tubular casing having a portion adapted to engage with a lubricant receiving fitting, a plunger having a bore therethrough slidably mounted in said casing, the outer end of said plunger being adapted for sealing engagement with said fitting, a closure for the inner end of said casing forming a pressure chamber at the rear of said tubular plunger, a conduit member slidably disposed through said closure, said conduit member having a portion within the pressure chamber of lesser diameter than said plunger, said conduit member being adapted for connection with a source of lubricant supply, and means for closing the bore of said plunger when said conduit member is moved inwardly of the pressure chamber.

8. A lubricant discharge nozzle comprising, a tubular casing having a jaw at one end for engaging with a lubricant receiving fitting, a plunger slidably mounted in the casing having a longitudinal bore therethrough and adapted to cooperate with said jaw to clamp said fitting therebetween when thrust is applied to the plunger, a conduit mounted for movement along the axis of said casing and adapted to enter the casing through the inner end wall thereof, the end of said conduit within said casing being formed so as to present a flat abutting wall engageable with the mouth of the inner end of the bore in said plunger to close the plunger bore when thrust is applied to the conduit and means for coupling said conduit with a source of lubricant supply whereby lubricant may be conducted into the casing.

9. A lubricant discharge nozzle comprising, a conduit having one end formed for engagement with a lubricant receiving fitting, lubricant pressure operated means for clamping said conduit upon said fitting, and thrust-operated means for closing said conduit, said closing means including a passageway for conducting lubricant under pressure to said pressure operated clamping means, said closing means being subjected to the lubricant pressure on said clamp operating means whereby said lubricant pressure may act to open said conduit closure means against thrust applied thereto.

10. In combination, a nozzle member having an outlet and a seal effecting portion surrounding said outlet for making a lubricant tight seal with the receiving end of a lubricant fitting, a clamp member associated with said nozzle member and movable relative thereto to clamp a fitting therebetween, rigid means structurally independent of said members and positively engageable with the nozzle member for applying thrust there against to urge said nozzle member toward and against a fitting, and pressure operated means for imparting a clamping movement to said clamp member.

OTTO B. CLARK.